US007356584B2

(12) United States Patent
Yip

(10) Patent No.: US 7,356,584 B2
(45) Date of Patent: Apr. 8, 2008

(54) OPTIMIZATION OF SERVICE PROVIDER LOAD BALANCING

(75) Inventor: John Yip, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 866 days.

(21) Appl. No.: 10/379,093

(22) Filed: Mar. 3, 2003

(65) Prior Publication Data

US 2004/0177144 A1    Sep. 9, 2004

(51) Int. Cl.
*G06F 15/173* (2006.01)
*G06F 11/00* (2006.01)
*G06F 15/16* (2006.01)

(52) U.S. Cl. ................. 709/224; 709/226; 709/235; 370/229

(58) Field of Classification Search ............... 709/224, 709/226, 235; 370/229, 238, 242
See application file for complete search history.

(56) References Cited

U.S. PATENT DOCUMENTS

| 6,594,268 | B1 * | 7/2003 | Aukia et al. | 370/400 |
|---|---|---|---|---|
| 6,633,544 | B1 * | 10/2003 | Rexford et al. | 370/238 |
| 2005/0204036 | A1 * | 9/2005 | Farhat et al. | 709/224 |

OTHER PUBLICATIONS

Mohamed, J.L. et al., *Numerical Algorithms*, 1986, Springer-Verlag New York, Inc.
Ngia, L.S.H., "Adaptive Neural Nets Filter Using a Recursive Levenberg-Marquardt Search Direction", *Signals, Systems & Computers*, 1998, 697-701.
Ngia, L.S.H., "Efficient Training of Neural Nets for Nonlinear Adaptive Filtering Using a Recursive Levenberg-Marquardt Algorithm", *IEEE Transactions on Dignal Processing*, 2000, 48(7), 1915-1927.
Petrovic, I. et al., "An Efficient Newton-type Learning Algorithm for MLP Neural Networks", *NC[Computer File] International ICSC/IFAC Symposium*, 1998, 551-557.
Rainer Kress, *Numerical Analysis*, 1998, Springer-Verlag New York, Inc.
Rao, N.D. et al., "Power System Static State Estimation by the Levenberg-Marquardt Algorithm", *IEEE Transactions on Power Apparatus and Systems*, 1980, 99(2), 695-702.
Sjoberg, J. et al., "Separable Non-Linear Least-Squares Minimization-Possible Improvements for Neural Net Fitting", *Neural Networks for Signal Processing*, 1997, 345-354.

* cited by examiner

*Primary Examiner*—Jason Cardone
*Assistant Examiner*—Tanim Hossain
(74) *Attorney, Agent, or Firm*—Woodcock Washburn LLP

(57) ABSTRACT

A method is disclosed for balancing a load of clients of a network across a plurality of communications providers. Connection data that includes information on attempts to connect to the network and whether each attempt was successful is collected. A time-independent demand curve for each of the communications providers representing a likelihood of successful connection as against client load is determined, based on the collected connection data. The load of clients is then apportioned across the communications providers based on the time-independent demand curve for each of the communications providers.

40 Claims, 4 Drawing Sheets

OPTIMIZATION OF SERVICE PROVIDER LOAD BALANCING

FIELD OF THE INVENTION

The present invention relates to an environment where multiple intermediate entities provide a service to end clients on behalf of an ultimate entity. More particularly, the present invention relates to an arrangement where multiple communications providers provide access to a computer network on behalf of an Internet Service Provider (ISP) or the like to clients. Even more particularly, the present invention relates to optimizing a load of clients across such communications providers with respect to a derived time-independent demand curve.

BACKGROUND OF THE INVENTION

Internet Service Providers (ISPs) provide Internet access to clients. Such clients are typically home clients, but may also be business or high-speed clients. For example, an ISP may provide dial-up support to a home client, while providing cable or Digital Subscriber Line (DSL) support to another home client, or may provide any of these or other services, such as for example T1 or T3 connectivity, to business clients.

One method of providing Internet access to a client is for an ISP to install and operate equipment in the area in which the client is located. Alternatively, an ISP may install and operate sufficient equipment to service its clients regardless of the location of such clients. Such methods permit an ISP to exercise direct control over such equipment, thereby allowing the ISP to precisely control quality of service to its clients. However, such methods also have the limitation of requiring the ISP desiring to provide services over a large geographic area to install and maintain equipment capable of servicing such an area. When the geographic area to be serviced is especially large, such as for example in a situation where the ISP desires to provide regional or even nationwide Internet services, the amount of equipment and associated costs, such as for example procurement, maintenance, management and staffing costs, increases rapidly. In fact, in an extreme case the costs involved with implementing such a system may exceed the financial or management capacity of any single ISP.

A more practical method of providing such large-scale Internet access is for an ISP to enter into an agreement with one or more local communications providers to provide connective services to clients on behalf of the ISP. For example, a large, nationally-recognized ISP may contract with a plurality of local communications providers so such ISP does not have to deploy equipment throughout a nation or region. In this way, the ISP can have broad geographic coverage without the difficulty and expense of actually maintaining a large network. Instead, such an ISP exerts control over such local communications providers according to such contract or other agreement to provide service to clients that meets certain ISP criteria. Each local communications provider may exclusively cover a distinct geographic area or, and as is more common in heavily populated areas, several local communications providers may simultaneously cover the same geographic area. An ISP providing dial-up service in such an area by way of multiple local communications providers, for example, may assign clients to different local communications providers by assigning different telephone numbers for the clients to dial. The assignment of clients to different local communications providers may take place according to a contract or other agreement, as discussed above. Using such a method, an ISP may use several local communications providers to provide service to a populated area, even in a situation where each of such local communications providers may not have sufficient capacity to individually provide complete service to such an area. An additional aspect of such an arrangement is that such arrangement may be transparent to clients in that it appears to the clients that such connective services are being rendered directly by the ISP and not by a local communications provider on behalf of the ISP. In this way, a local communications provider may benefit from an ISP's name recognition while an ISP gains capacity it would not otherwise have.

In contracting such Internet services to local communications providers, an ISP typically monitors each local communications provider to track performance data, such as for example: the time of a connection attempt, whether such attempt was successful, the time of a connect and disconnect, a number of clients being serviced at a certain time, and/or the like. Such performance data provides to the ISP an approximate indication of service quality provided to clients by each local communications provider because such data is relevant to clients' experience with such local communications provider. Typically, an ISP will want its local communications providers to operate within certain thresholds of service quality. This is particularly important in situations where an ISP—local communications provider relationship is transparent to a client as discussed above. In such a situation, a client who receives poor service quality from a local communications provider may ascribe such poor service quality to the ISP, from which such client believes such connective services are rendered. Such thresholds used by an ISP may be, for example, a percentage of successful connection attempts out of all connection attempts, average percentage of capacity in use, client wait time, average signal quality, data transmission speed, and/or the like. Each local communications provider may also exhibit a different response to increasing client load. For example, a local communications provider with a smaller client capacity may experience a faster drop-off in service quality than a local communications provider with a larger client capacity. Such local communications provider responses may be determined from historical performance data, hardware data regarding each local communications provider and/or the like.

Additionally, an ISP may acquire performance data from individual clients. For example, an ISP may configure its system to cause a client to log connection information such as for example, connection attempts, successful or unsuccessful attempts, disconnects, data speed during connection, and/or the like. When a client connects to the Internet, such an ISP may request such performance data from the client's system. Such a request may be transparent to the client or may require the active participation of the client, such as for example providing permission to the ISP to receive such performance data. Such a transmission of performance data from a client system may occur every time a client connects to the Internet, at set times, according to system requirements, and/or the like.

Regardless of the source of such performance data, an ISP may use such performance data as a basis for periodically reassigning one or more clients amongst such local communications providers to load balance as between local communications providers in a geographic area. Such a reassignment may be accomplished in any number of ways. For example, a dial-up ISP may change the assignment of a local communications provider while a client is connected to the Internet. In such a method, an update may be sent by the ISP to the client, whereby the update changes the dial-up number(s) for such client to reflect the new local communications provider assignment. Other methods may include manual updates and/or the like.

An ISP may decide to change a local communications provider assignment for any number of reasons. For example, a particular local communications provider may not be capable of adequately handling the client demand it is experiencing, so the ISP may change the assignment to another local communications provider having adequate capability to satisfy additional client load. Likewise, a particular local communications provider may be underutilized, so the ISP may change the assignment of a client associated with another local communications provider to increase the underutilized local communications provider's client load. Also, an ISP may be able to consolidate the number of local communications providers it is using if client demand is such that fewer local communications providers could handle the demand without adversely affecting either the ability of clients to connect or connection quality. An additional factor that may influence an ISP in deciding to reassign clients to a different local communications provider may be the contract price and other details of a contract with such local communications provider. Such a price, for example, may affect the relative weighting of the thresholds of service quality discussed above. In addition, such a reassignment may be subject to a contract or other agreement as discussed above. An added complication is that an ISP cannot simply reassign all clients to the lowest-cost local communications provider without the risk that such a reassignment will either overload such local communications provider, or will at least lower the probability of a client successfully connecting to such local communications provider.

Conventionally, when determining whether to reassign clients amongst local communications providers, an ISP reviews, for example, each local communications provider's performance data, such provider's performance with respect to thresholds of service quality and/or the like. An ISP, however, presently lacks a means for accurately and automatically determining time-independent load balancing from such performance data and the like.

In contrast, a conventional method of reassigning client load typically entails a manual review of such performance data and the like, and then a decision is made with respect to such reassignment. Such decision, while based on performance data and the like, still retains a large element of guesswork. For example, such performance data typically has time as a factor, such as for example: connection rates per hour, connection rates varying continuously over time, and/or the like. As a result, any reassignment decision is based on time-specific data has been found to be overly complex. In addition, such a manual process is inherently inefficient because a manual review takes a greater amount of timer than an automated calculation, and therefore a manual calculation can be performed less frequently during any given period of time. What is needed is a method for automatically performing load balancing based on time-independent performance data.

SUMMARY OF THE INVENTION

The present invention overcomes these problems by providing a method of balancing a load of clients across a plurality of intermediate providers. The clients can be clients of a network, and each provider may act to operatively connect one or more of the clients to the network. The method is carried out to achieve an optimal client load, in terms of a desired connection probability or the like, across all of the providers.

In the method, connection data regarding each of the plurality of communications providers is collected. The connection data includes information on attempts to connect to the network by way of each communications provider and whether each attempt was successful. A time-independent demand curve for each of the communications providers representing a likelihood of successful connection as against client load is determined, based on the collected connection data. The load of clients is then apportioned across the communications providers based on the time-independent demand curve for each of the communications providers.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary embodiments of the invention; however, the invention is not limited to the specific methods and instrumentalities disclosed. In the drawings.

DETAILED DESCRIPTION OF ILLUSTRATIVE EMBODIMENTS

Overview

The present invention is directed to a method and computer readable medium for optimizing a load of clients across a plurality of intermediate providers. The present invention can be implemented to balance a load of clients across a plurality of communications providers that provide connectivity to a network. Means for connecting to such a network such as dialup connections, cable modems, DSL connections and the like exhibit properties suitable for use with the present invention, but other connection means are compatible as well. Also, networks such as the Internet or the like are suitable for use with the present invention, but again, other networks and the like are compatible with the present invention.

The present invention improves the ability of an ultimate provider, such as for example an ISP, to efficiently optimize client load across a plurality of providers. In particular, the present invention enables efficient optimization of a load of computer clients across a plurality of communications providers. Conventionally, such an optimization entails a manual review of performance data and the like, and then a decision must be made with respect to such reassignment. The present invention provides a means for calculating a time-independent demand curve that represents client connection probability as against client load. A means for incorporating additional variables into such demand curve, such as for example a monetary cost associated with increasing connection probability is also provided.

Exemplary Computing Environment

Figure 1:
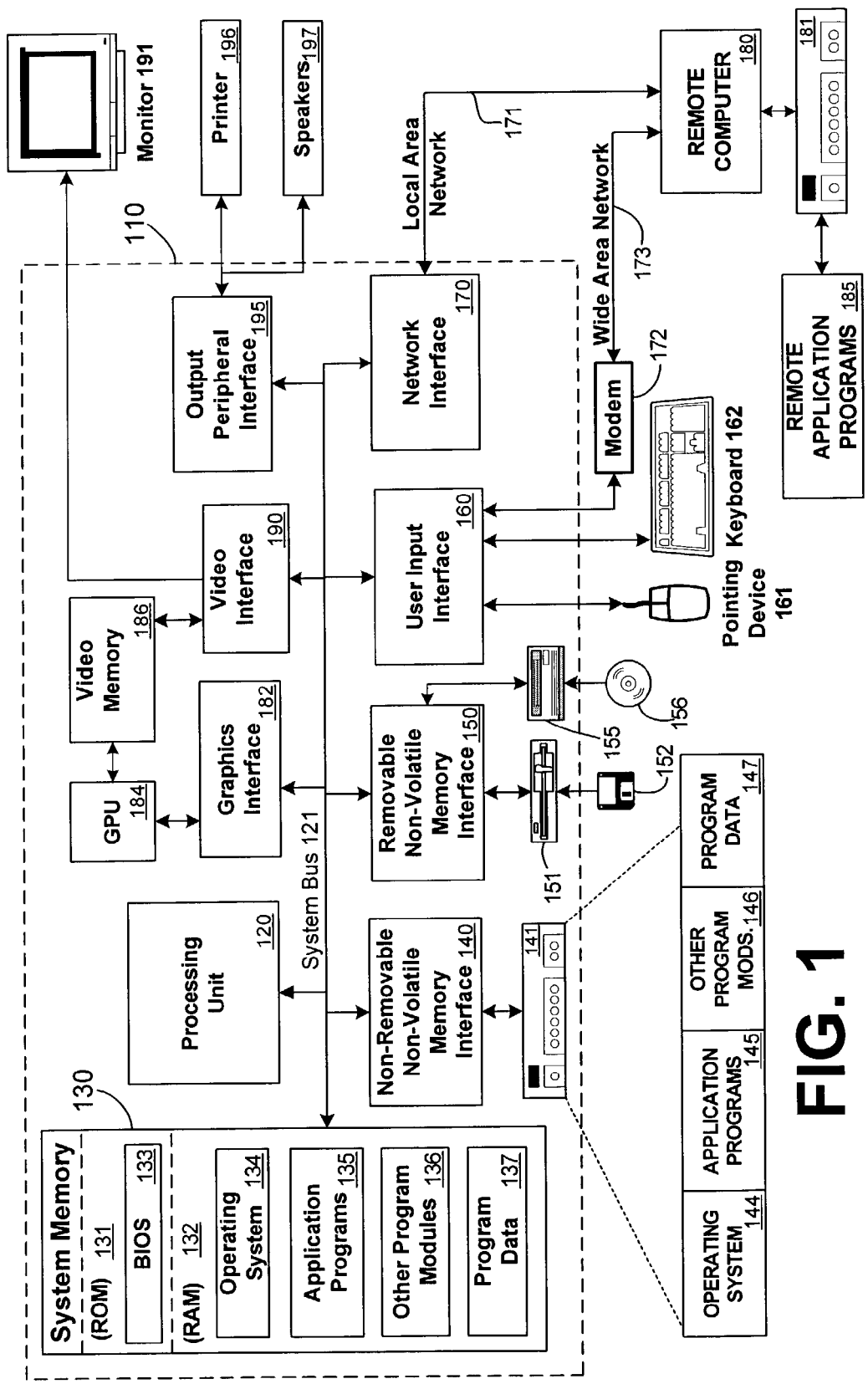
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 14, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A client may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a client input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers such as a remote computer 180. The remote computer 180 may be a personal computer, a server a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the client input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks Or Architectures

Various distributed computing frameworks have been and are being developed in light of the convergence of personal computing and the Internet. Individuals and business clients alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have client information automatically updated and synchronized on all of them, (2) increased interactive capability for web sites, enabled by greater use of XML rather than HTML, (3) online services that feature customized access and delivery of products and services to the client from a central starting point for the management of various applications, such as e-mail, for example, or software, such as Office NET, (4) centralized data storage, which will increase efficiency and ease of access to information, as well as synchronization of information among clients and devices, (5) the ability to integrate various communications media, such as e-mail, faxes, and telephones, (6) for developers, the ability to create reusable modules, thereby increasing productivity and reducing the number of programming errors, and (7) many other cross platform integration features as well.

While exemplary embodiments herein are described in connection with software residing on a computing device, one or more portions-of the invention may also be implemented via an operating system, API, or a "middle man" object between a coprocessor and requesting object, such that services may be performed by, supported in, or accessed via all of NET's languages and services, and in other distributed computing frameworks as well.

Exemplary Embodiments

Figure 2:
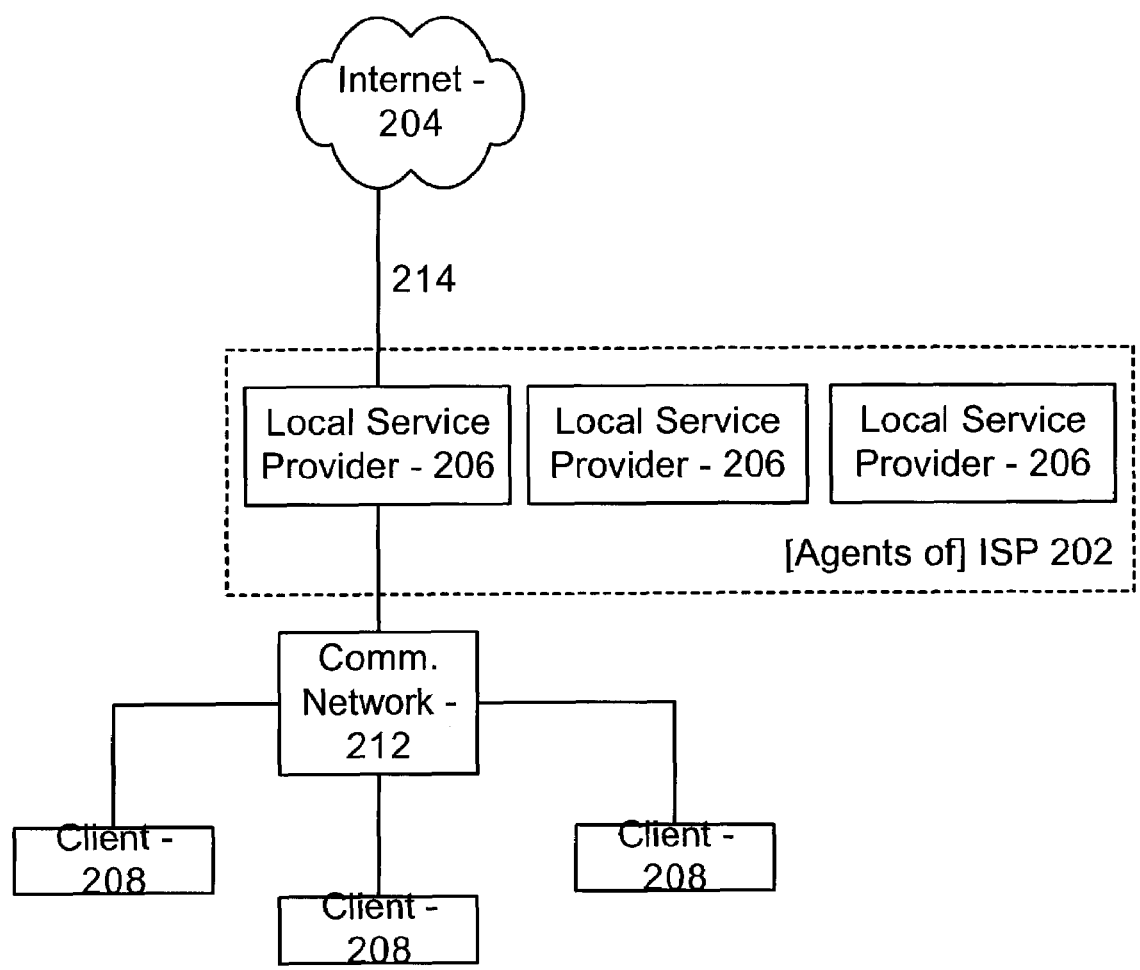
FIG. 2 is a functional diagram illustrating an example of a relationship between an ISP, a local communications provider and clients.

Referring now to FIG. 2, a functional diagram of a relationship between an ISP, a plurality of local communications providers that actually provide connection services for the ISP in a given geographic region and clients in the geographic region is provided.

Each such local communications provider 206 is in operative communication with each client 208 by way of communications network 212. Client 208 may be an individual person, a company, an electronic device such as, for example, a computer or the like. Communications network 212 may be any communications method client 208 may employ to operatively connect to local communications provider 206, such as for example by way of a local telephone company, DSL line, cable modem, other dedicated line and/or the like. Local service provider 206, in turn, is operatively connected to Internet 204, or other network, by way of network 214. Network 214 may be any means which each local communications provider 206 may employ to connect to Internet 204, such as for example a dedicated line or the like. Local service provider 206 may employ any type of electronic equipment in conjunction with network 214, such as for example a router, gateway, a general or special purpose computer or the like. In such a manner, therefore, local communications provider 206 provides client 208 with operative connectivity to Internet 204. Typically, and as discussed above, local communications provider 206 may be in a contractual or other relationship with ISP 202, and local communications provider 206 may provide an Internet 204 connection to client 208 transparently or anonymously on behalf of the ISP 202 entity.

ISP 202 may obtain connection data over time from each local communications provider 206 and/or from the clients 208. Connection data collected from each local communications provider 206 may be, for example, a record of each successful connect and disconnect of a client 208. Connection data may include additional information, such as for example the telephone number dialed by such client 208, if such client 208 utilizes a dialup communications network 212, or identifying information of the client 208, and/or the like. Connection data from each client 208 may include, for example, a list of connection attempts, the time of each such attempt, and the results of such attempt. ISP 202 may either use such collected connection data directly, or may aggregate such data or perform other mathematical or statistical operations on such connection data to render it suitable for use by the ISP 202 to perform load balancing among local communications providers 206. ISP 202 may use any means for collecting and processing the data, such as for example a general or special purpose computer or the like.

In particular, with such connection data, ISP 202 can develop usage statistics regarding how busy each local communications provider 206 is at particular times, referred to as client load, and the success rate of clients 208 in connecting to the local service provider 206 during such times. As may be appreciated, tracking such information over time shows fluctuations in client load as may be encountered from day to day and hour to hour. For example, such connection data should show that each local communications provider 206 experiences light client loads at 3 AM and relatively light client loads at 7 PM each day, and that a weekend afternoon has a relatively higher load while a weekday afternoon has a relatively lower load, at least with respect to residential clients.

Figure 3A:
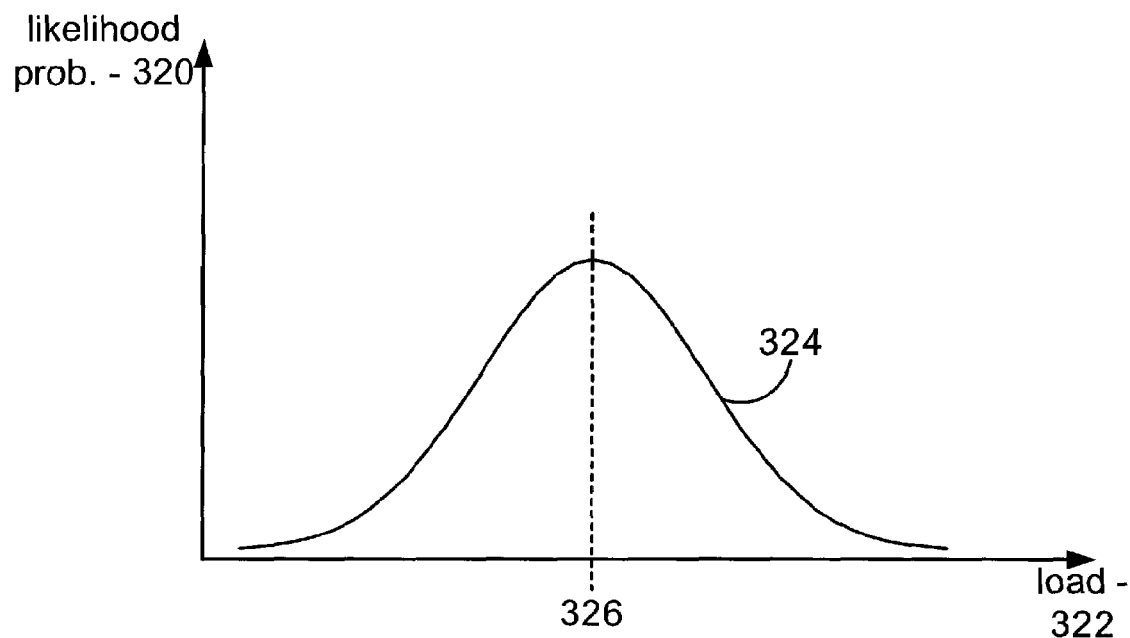
FIG. 3a is a diagram showing a bell-shaped curve illustrating load for a particular local communications provider over capacity for a given time period.

For any particular time period, such as for example from 12 noon to 1 PM on a weekday, connection data from such time period may be employed to construct a bell-shaped curve 324 such as that shown in FIG. 3a. As may be appreciated, in such curve 324, the x-axis represents load and the y-axis represents the likelihood of a particular load during the time period. Thus, the bell-shaped curve 324 shows that for the particular time period an expected load 326 is most likely, but that the actual load may vary from the expected load 326. ISP 202 may generate an individual bell-shaped curve 324, for each local communications provider 206, for each time period of interest. However, and significantly, for multiple local communications providers 206 and finer granularities in time period the number of generated curves 324 can easily become cumbersome to the point that examining the data to perform load balancing is overly complex.

Figure 3B:
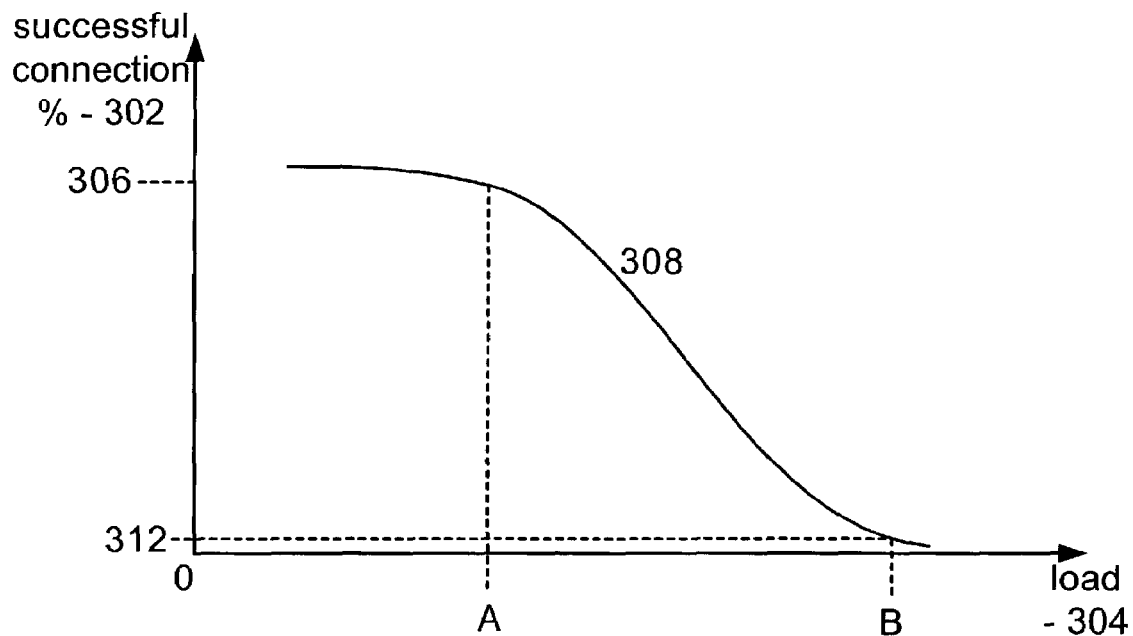
FIG. 3b is a diagram showing an exemplary time-independent load curve in accordance with one embodiment of the present invention.

Accordingly, and turning now to FIG. 3b, such connection data is employed to define for each local communications provider 206 a time-independent demand curve 308 that represents the likelihood of a successful connection 302 versus actual load 304 for the local communications provider 206 over all time periods. Load 304 may be, for example, client service requests, dialup connection requests, or the like. Demand curve 308 may be generated from the collected connection data by using any appropriate method, such as for example a Levenberg-Marquardt, Gauss-Newton, Steepest Descent method and/or the like.

As seen in FIG. 3b, the demand curve 308 exhibits an upper limit 306 corresponding to a region between loads 0 and N; wherein the likelihood of a successful connection is relatively high and stable. Correspondingly, the demand curve 308 exhibits a lower limit 312 corresponding to loads of B and higher where the likelihood of a successful connection is relatively low and stable. Significantly, between the upper and lower limits 306, 312 is a rapidly-changing region corresponding to loads between A and B, where it is seen that increasing load results in decreasing likelihood of a successful connection.

As may be appreciated, any particular local communications provider 206 should not be operating with a time-independeht load of B or above as set by the ISP 202, especially inasmuch as the relatively low likelihood of a successful connection is undesirable both by clients 208 and the ISP 202. Correspondingly, the local communications provider 206 should not be operated with a time-independent load between 0 and A as set by the ISP 202, especially inasmuch as the relatively high likelihood of a successful connection is achieved with a relatively low load and an underutilization of available capacity. Thus, the local communications provider 206 should be operating at a time-independent load somewhere between A and B as set by the ISP 202. That said, the ISP 202 may nevertheless set loads for each particular local communications provider 206 on additional factors, such as cost, that require a time-independent load lower than A or higher than B.

Figure 4:
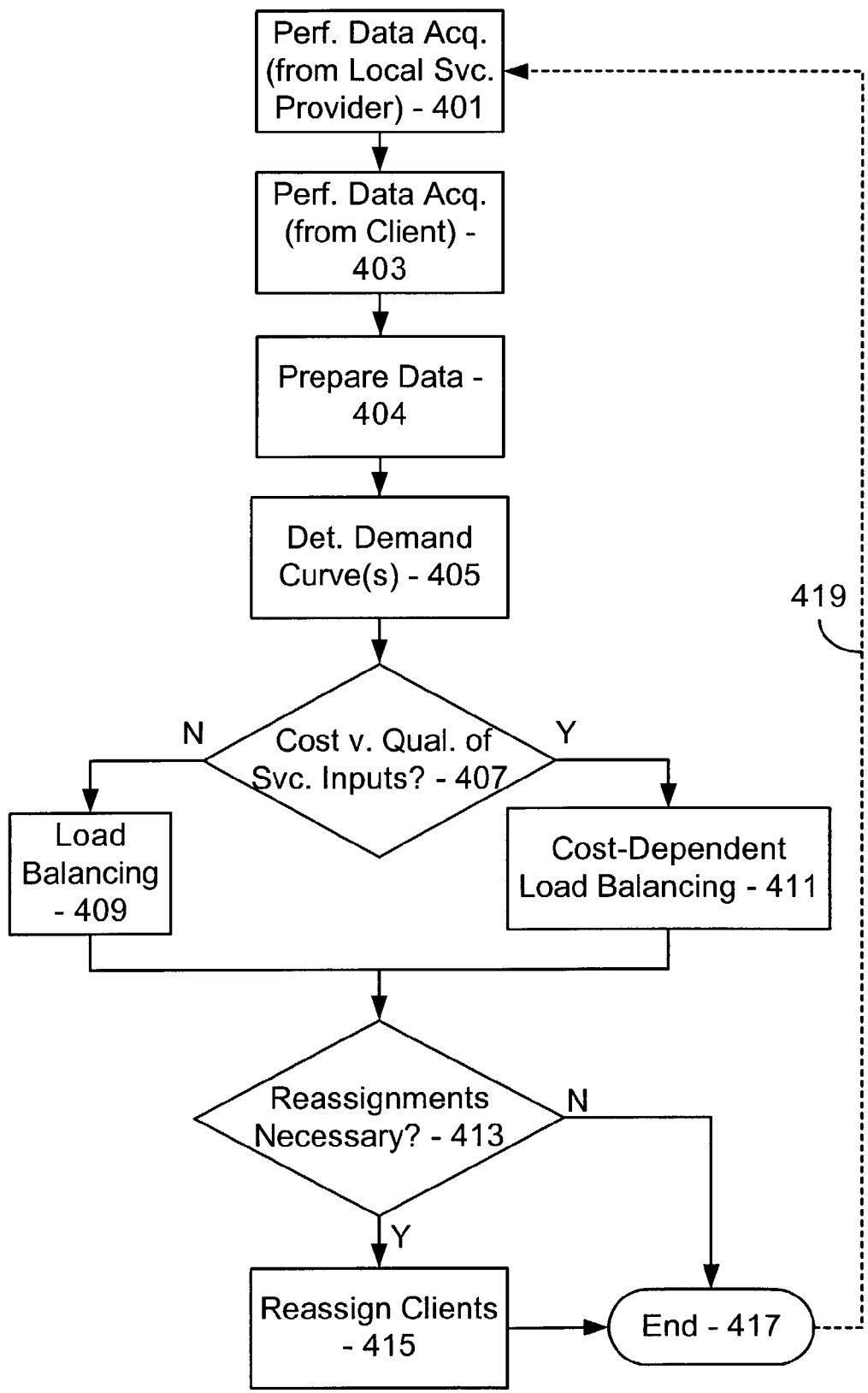
FIG. 4 is a flow chart illustrating a method of reassigning client load amongst local communications providers in accordance with one embodiment of the present invention.

Referring now to FIG. 4, a method of generating a time-independent demand curve 308 and conducting a load balancing determination amongst a plurality of local communications providers 206 in accordance with an embodiment is described. In the description that follows, it is noted that those of skill in the art should be aware of the statistical analyses and calculations performed herein, such as the aforementioned Levenberg-Marquardt algorithm, Gauss-Newton method, Steepest Descent method and/or the like, and therefore a detailed explanation of such matters is omitted for the sake of clarity. More details on the Levenberg-Marquardt algorithm and Steepest Descent method may be found in: Rainer Kress, *Numerical Analysis* (Springer-Verlag New York, Inc. 1998). Details on Gauss-Newton and additional details on Levenberg-Marquardt may be found in: *Numerical Algorithms* (J. L. Mohamed and J. Walsh eds., Oxford University Press 1986). Each of the above-mentioned references are hereby incorporated by reference in their entirety.

At step 401, and as disclosed above in connection with FIG. 3a, ISP 202 acquires performance data for and from each local communications provider 206 for which ISP 202 desires to determine a demand curve 308. At step 403, ISP 202 may in addition acquire such performance data from clients 208. ISP 202 may perform step 401 and 403 inclusively, or may perform only step 401 or 403.

At step 404, ISP 202 may prepare data collected in step 401 and/or 403 for use in later steps. For example, data collected from local communications provider 206 may simply be a sequential listing of each client 208 connect and disconnect time. ISP 202, therefore, may have to perform a data analysis or the like on such raw data to render such data suitable for use in calculating demand curve 308. Likewise, if such performance data is acquired from client 208, ISP 202 may have to aggregate such client 208-acquired performance data with the performance data acquired from other clients 208 in order to render such performance data suitable for use. Such an aggregation may include all clients 208 associated with local communications provider 206, a statistical sampling f some clients 208, and/or the like.

At step 405, ISP 202 uses such prepared performance data to determine a time-independent demand curve 308 for each of a plurality of local communications providers 206 that service a particular region of interest. ISP 202 may select any number of local communications providers 206 for which a demand curve 308 will be generated, and ISP 202 may also exclude one or more of such local communications providers 206 in the region of interest from such demand curve 308 determination. ISP 202 need only include local communications providers 206 that will be load balanced according to an embodiment, and any selection of local communications providers 206 to be included in such load balancing is consistent with an embodiment.

In an embodiment, the aforementioned Levenberg-Marquardt algorithm is employed to generate each time-independent demand curve 308. Generally, in the Levenberg-Marquardt algorithm, a probability that a connection request will be successful when local communications provider 206 ($D_k$) is servicing a load L of client 208 connections may be defined as $P_k(L)$. As noted above in connection with FIG. 3b, demand curve 308 may take an idealized S-shaped curve form, in which case a normal distribution of such curve may be provided by the following definition:

$$n_0(y) = \frac{e^{-(y-\mu_0)^2/(2\sigma_0^2)}}{\sigma_0\sqrt{2\pi}}$$

Accordingly, a connection probability may be defined as:

$$P_k(L) = \frac{1}{C_k}\int_L^\infty n_0\left(\frac{x}{C_k}\right)dx$$

Resolving the above integral yields a demand curve 308 such as that illustrated in FIG. 3b. For clarity, the above integral and resulting demand curve 308 assume a purely probabilistic client connection request distribution While such a situation may occur when using a real-world data-derived demand curve 308, it is more likely that such a demand curve 308 may deviate from the above idealized model, because of irregularities in a client 208 connection request distribution. Either situation is equally consistent with an embodiment.

Depending on the regularity of demand curves 308 and the degree of similarity between local communications providers 206 in the particular region of interest, a set of values may be chosen to characterize each such demand curve 308. For example, each demand curve 308 may be characterized based on client load 304 values at which success likelihood 302 is, for example, ⅓ at load B and ⅔ at load A, in which case each local communications provider 206 may be characterized by a set of two values. Alternatively, each demand curve may be characterized based on a single ideal load value between loads A and B, or a load where the likelihood of connection success is a pre-determined percentage. Local communications provider 206 may be characterized by any number of such values, as any number of values is equally consistent with an embodiment. As may be appreciated, such load values represent the effective capacity of a local communications provider 206 to handle client connection attempts. In an idealized model, each such demand curve 308 may be characterized by a single value, such as for example $C_k$, for capacity.

At step 407, ISP 202 determines whether cost versus quality of service inputs will be accounted for in the load balancing process. Such inputs are not absolutely necessary, but using such inputs enables such ISP 202 to, for example, account for differences in contract prices between local communications providers 206, or to make a subjective judgment that a certain loss of connection probability 302 in exchange for reduced operating expenses is acceptable. If no such inputs will be considered, the process continues at step 409. If such inputs will be considered, such process continues at step 411.

At step 409, an embodiment determines the partition of client 208 connection requests among a plurality of local communications providers 206. Each local communications provider 206 ($D_k$) may receive a fraction $f_k$ of client 208 connection requests. The total of all such fractions $f_k$ is equal to 1, as indicated by the following formula:

$$\sum_j f_j = 1$$

Such distribution among local communications providers 206 reduces to:

$$f_k = \frac{C_k}{\sum_j C_j}$$

The client load 304 for each local communications provider 206 is $L_k = L_0 \times f_k$, where $L_0$ is total client load 304 across all local communications providers 206. For each local communications provider 206 ($D_k$), an equal likelihood of connection success at such specified load may be independent of k, as indicated by the expressions:

$$P_k(L_k) = \int_{L_0 \times \frac{C_k'}{\sum_j C_j}}^\infty \frac{1}{C_k} n_0\left(\frac{x}{C_k}\right) dx$$

$$= \int_{\frac{L_0}{\sum_j C_j}}^\infty n_0(z) dz$$

Once such expression is populated with empirical data, ISP 202 may determine an optimum client load 304 for each local communications provider 206. For example, if for a particular region there are 2 local communications providers 206 A and B, and it is decided based on the determined demand curves 308 of step 405 that A should have a load of X and B should have a load of Y, then X/(X+Y) of all clients 208 in the region should be assigned to A and Y/(X+Y) of all such clients 208 should be assigned to B. Ideal load balancing in a particular region should occur in real time, based on current optimal loads for each local communications provider 206 that services the region. However, it may be the case that reassignment of clients takes place after a client connects, in which case a time delay in reassignment and load balancing takes place.

At step 411, the partition of client 208 connection requests among a plurality of local communications providers 206 is determined while additionally accounting for cost versus service quality tradeoffs decided upon by ISP 202. For example, a cost per client 208 connection for local communications provider 206 ($D_k$) may be represented by $S_k$. As discussed above, ISP 202 could simply distribute all clients 208 across only local communications providers 206 whose associated cost per connection $S_k$ is relatively low. However, a negative impact on quality of service, such as for example in connection success likelihood 302 or the like due to, for example, increased client 208 retry counts would probably result. The ISP 202 may therefore make a tradeoff between cost and quality of service to clients 208. For example, ISP 202 may be able to reduce costs by reassigning clients 208 to a lower cost local communications provider 206, but increasing such a local communications provider's 206 client load 304 will decrease connection success likelihood 302, according to the corresponding demand curve 308 for such local connection provider 206. ISP 202 may instead assign only a limited number of clients 208 to a lower cost local communications provider 206 so such local communications provider's 206 connection probability 302 remains above lower limit 312.

In an embodiment, ISP 202 may assign a fixed acceptable monetary cost for a fixed fractional increase in connection probability 302 for each client 208 connection request, such as for example dollars per percentage increase in connection probability 302, which may be represented by the variable Q. Alternatively, ISP 202 may assign a variable acceptable monetary cost for a fractional increase in connection probability 302, such as for example by making Q a function of connection probability 302. As may be appreciated, any combination of fixed and variable factors may be used. A choice of Q determines a set of cost-corrected local communications provider 206 demand curves 308, where the load balancing discussed above in connection with step 409 is performed, but instead of using the provider curves $P_k(L)$, ISP 202 uses:

$$\tilde{P}_k(L) = P_k(L) - \frac{S_k}{Q/100}$$

Such a cost-adjusted fractional distribution of client 208 connection requests across local communications providers 206 becomes $\{\tilde{f}_k\}$ using the local communications provider 206 load balancing described, where values, $\{\tilde{P}_k(L_0 \times \tilde{f}_k)\}$ are equal, and $$\sum_j \tilde{f}_j = 1.$$

Accordingly, moving client 208 from local communications provider 206 $D_a$ to local communications provider 206 $D_b$, under conditions of client load 304 L, incurs a cost of $S_b - S_a$, and increases the connection probability 302 by:

$$P_b(L \times \tilde{f}_b) - P_a(L \times \tilde{f}_a) =$$
$$\left(\tilde{P}_b(L \times \tilde{f}_b) + \frac{S_b}{Q/100}\right) - \left(\tilde{P}_a(L \times \tilde{f}_a) + \frac{S_a}{Q/100}\right) = \frac{S_b - S_a}{Q/100}$$

Which yields a cost per percentage connectivity increase of:

$$100 \times (S_b - S_a) \div \left(\frac{S_b - S_a}{Q/100}\right) = Q$$

As Q becomes very large, meaning that ISP 202 has decided to accept a very high cost for increased connection probability 302, demand curve 308 defined by $\tilde{P}_k(L)$ approaches demand curve 308 defined by $P_k(L)$. ISP 202 may choose $\tilde{P}_k(T)$ appropriately depending on any number of variables, such as for example, cost, number of local communications providers 206, and/or the like. For example, $\tilde{P}_k(L)$ used above is based on a functional T where B is a constant:

$$T(g(x),B) = g(x) + B$$

$$\tilde{P}_k(L) = T\left(P_k(L), \frac{-S_k}{Q/100}\right)$$

Many other choices of T may be made. For example, T could reflect an ISP 202 fee schedule that provides discounted connectivity pricing if specified client load 304 figure are reached. While the above equation is used herein in an illustrative example, any modification is consistent with the present invention. For example, in some applications client load 304 peaks in a diurnal fashion, where such diurnal client load 304 demand curves 308 exhibit statistically significant differences in behavior for increasing versus decreasing client load 304 regions. In such a situation, an embodiment may employ separate demand curves 308 and local communications provider 206 client load 304 distribution for each of the two regions.

Whether load balancing is performed with or without reference to costs (steps 411 or 409, respectively) the result is an optimized time-independent load calculated for each local communications provider 206 servicing a particular region of interest. At step 413, ISP 202 determines whether a reassignment of client's 208 amongst local communications providers 206 is necessary. In some situations, client load 304 amongst local communications providers 206 may have remained static for the time period during which performance data was gathered, and therefore no reassignment of clients 208 is necessary if such client load 304 is acceptable. In such a situation, ISP 202 terminates the load balancing determination at step 417. In most situations, however, clients 208 will need to be reassigned to different local communications providers 206 that service the region in order to maintain acceptable connection probability 302, acceptable cost levels and/or the like. In such a situation, ISP 202 continues to step 415 where such reassignment takes place. As discussed above, such a reassignment may be accomplished in any number of ways, such as for example by changing an assignment of a local communications provider 206 for a particular client 208 while such client 208 is connected to the Internet. In such a method, an update may be sent by ISP 202 to client 208, and connection information or the like may be changed to reflect a new local communications provider 206. Other methods may include, for example, manual updates and/or the like. Any method of updating a client 208 assignment amongst local communications providers 206 is consistent with an embodiment. At the conclusion of such a reassignment, ISP 202 terminates the load balancing determination at step 417. Arrow 419 indicates that the method of FIG. 4 may be repeated at any interval desired by ISP 202.

The method of FIG. 4 may also be employed to assist ISP 202 to make a variety of strategic decisions. For example, generation of demand curve 308 provides a means for verifying whether a local communications provider 206 actually has a client load 304 capacity that such local communications provider 206 may have claimed to ISP 202. In such a verification, the data-derived fall off of connection probability 302 of demand curve 308, possibly within the region between upper limit 306 and lower limit 312, may be compared to a claimed client load 304 capacity. If such a comparison yields a disparate result, such local communications provider's 206 claims of client load 104 capacity may be suspect, and therefore warrant further investigation on the part of ISP 202. Any additional use of the method of FIG. 4 is also consistent with the present invention.

While the present invention has been described in connection with the preferred embodiments of the various figures, it is to be understood that other similar embodiments may be used or modifications and additions may be made to the described embodiment for performing the same function of the present invention without deviating therefrom. For example, one skilled in the art will recognize that the present invention as described in the present application may apply to any arrangement where a plurality of agent providers are servicing a load of clients, and an ultimate provider wishes to optimize such client load across such providers. Such arrangement has been described herein with respect to communications providers providing access to a computer network, typically the Internet, but it may be appreciated that such arrangement may be for any type of service by way of any type of medium. Therefore, the present invention should not be limited to any single embodiment, but rather should be construed in breadth and scope in accordance with the appended claims.

What is claimed:

1. A method of balancing a load of clients across a plurality of local communications providers of an internet service provider, wherein each of said local communications providers acts to operatively connect one or more of said clients to the internet in a given geographic region and the local communications providers are coupled to the load of clients via a communication network, said method comprising:

collecting connection data regarding each of the plurality of local communications providers, the connection data including information on attempts to connect to the internet by way of the local communications provider and whether each attempt was successful;

determining, for each of the plurality of local communications providers based on the collected connection data corresponding thereto, a time-independent demand curve representing a likelihood of successful connection as against client load; and apportioning the load of clients across the plurality of local communications providers based on the time-independent demand curve for each of the plurality of local communications providers.

2. The method of claim 1, wherein the connection data corresponding to each local communications provider is collected from at least one client.

3. The method of claim 1, wherein the connection data corresponding to each local communications provider is collected from the local communications provider.

4. The method of claim 1, further comprising employing a Levenberg-Marquardt algorithm to determine the demand curve.

5. The method of claim 1, further comprising employing a Gauss-Newton method to determine the demand curve.

6. The method of claim 1, further comprising employing a Steepest Descent method to determine the demand curve.

7. The method of claim 1, wherein said apportioning step further comprises:

assigning a desired connection likelihood to each of the plurality of local communications providers based on the demand curve determined therefore;

determining a client load for each local communications provider corresponding to the desired connection likelihood thereof; and apportioning the load of clients to each of the plurality of local communications providers based on the determined client load thereof.

8. The method of claim 7, comprising apportioning the load of clients in a manner directly proportional to the client load at a desired connection likelihood specific to each of the plurality of local communications providers.

9. The method of claim 7, comprising apportioning the load of clients in a manner directly proportional to the client load at a desired connection likelihood common to all of each of the plurality of local communications providers.

10. The method of claim 1, further comprising:

determining a monetary cost per percentage increase in connection probability for each of the plurality of local communications providers; and determining a cost-corrected time-independent demand curve for each of the plurality of local communications providers based on the monetary cost per percentage increase in connection probability for each of the plurality of local communications providers; and comprising apportioning the load of clients across the plurality of local communications providers based on the cost-corrected time-independent demand curve for each of the plurality of local communications providers.

11. The method of claim 10, wherein the monetary cost per percentage increase in connection probability for each of the plurality of local communications providers is variable.

12. The method of claim 10, comprising determining a cost-corrected time-independent demand curve for each of the plurality of local communications providers based on the monetary cost per percentage increase in connection probability common to all of each of the plurality of local communications providers.

13. The method of claim 1, further comprising:

providing first connection data corresponding to a first local communications provider to each client, said first connection data adapted to provide the client with access to the internet by way of to the first communications provider; and providing, based on the apportionment of the load of clients, second connection data corresponding to a second local communications provider to at least one client, said second connection data adapted to provide the client with access to the network by way of the second local communications provider.

14. The method of claim 1, further comprising repeating the method on a regular basis.

15. The method of claim 1, wherein each client operatively connects to the internet by way of a dialup connection to one of the plurality of local communications providers.

16. The method of claim 1, wherein each client operatively connects to the internet by way of a cable connection to one of the plurality of local communications providers.

17. The method of claim 1, wherein each client operatively connects to the internet by way of a wireless connection to one of the plurality of local communications providers.

18. The method of claim 1, wherein each client operatively connects to the internet by way of a DSL connection to one of the plurality of local communications providers.

19. A computer-readable storage medium having computer-executable instructions for performing a method of balancing a load of clients across a plurality of local communications providers, wherein each of said local communications providers acts to operatively connect one or more of said clients to the internet in a given geographic region and the local communications providers are coupled to the load of clients via a communications network, said method comprising:

collecting connection data regarding each of the plurality of local communications providers, the connection data including information on attempts to connect to the internet by way of the local communications providers and whether each attempt was successful;

determining, for each of the plurality of local communications providers based on the collected connection data corresponding thereto, a time-independent demand curve representing a likelihood of successful connection as against client load; and apportioning the load of clients across the plurality of local communications providers based on the time-independent demand curve for each of the plurality of local communications providers.

20. The computer-readable storage medium of claim 19 wherein the method further comprises employing a Levenberg-Marquardt algorithm to determine the demand curve.

21. The computer-readable storage medium of claim 19 wherein the method further comprises employing a Gauss-Newton method to determine the demand curve.

22. The computer-readable storage medium of claim 19, wherein the method further comprises employing a Steepest Descent method to determine the demand curve.

23. The computer-readable storage medium of claim 19 wherein said apportioning step of the method farther comprises:
assigning a desired connection likelihood to each of the plurality of local communications providers based on the demand curve determined therefor;
determining a client load for each local communications provider corresponding to the desired connection likelihood thereof;
apportioning the load of clients to each of the plurality of local communications providers based on the determined client load thereof.

24. The computer-readable storage medium of claim 23 wherein the method further comprises apportioning the load of clients in a manner directly proportional to the client load at a desired connection likelihood specific to each of the plurality of local communications providers.

25. The computer-readable storage medium of claim 23 wherein the method further comprises apportioning the load of clients in a manner directly proportional to the client load at a desired connection likelihood common to all of each of the plurality of local communications providers.

26. The computer-readable storage medium of claim 19 wherein the method further comprises:
determining a monetary cost per percentage increase in connection probability for each of the plurality of local communications providers; and
determining a cost-corrected time-independent demand curve for each of the plurality of local communications providers based on the monetary cost per percentage increase in connection probability for each of the plurality of local communications providers;
and comprising apportioning the load of clients across the plurality of local communications providers based on the cost-corrected time-independent demand curve for each of the plurality of local communications providers.

27. The computer-readable storage medium of claim 26, wherein the monetary cost per percentage increase in connection probability for each of the plurality of local communications providers is variable.

28. The computer-readable storage medium of claim 26 wherein the method further comprises determining a cost-corrected time-independent demand curve for each of the plurality of local communications providers based on the monetary cost per percentage increase in connection probability common to all of each of the plurality of local communications providers.

29. The computer-readable storage medium of claim 19 wherein the method further comprises:
providing first connection data corresponding to a first communications provider to each client, said first connection data adapted to provide the client with access to the internet by way of to the first local communications provider; and
providing, based on the apportionment of the load of clients, second connection data corresponding to a second local communications provider to at least one client, said second connection data adapted to provide the client with access to the internet by way of the second local communications provider.

30. A system for balancing a load of clients across a plurality of local communications providers of an internet service provider, wherein each of said local communications providers acts to operatively connect one or more of said clients to the internet in a given geographic region and the local communications providers are coupled to the load of clients via a communications network, said system comprising:
an input device, wherein said input device receives connection data regarding each of the plurality of local communications providers, the connection data including information on attempts to connect to the internet by way of the local communications providers and whether each attempt was successful;
a memory operatively connected to said input device, wherein said memory stores the connection data;
a processor operatively connected to said memory, wherein said processor accesses said connection data and determines, for each of the plurality of local communications providers based on the collected connection data corresponding thereto, a time-independent demand curve representing a likelihood of successful connection as against client load, and apportions the load of clients across the plurality of local communications providers based on the time-independent demand curve for each of the plurality of local communications providers; and
an output device operatively connected to said processor, wherein said output device transmits the apportionment of the load of clients.

31. The system of claim 30, wherein the processor employs a Levenberg-Marquardt algorithm to determine the demand curve.

32. The system of claim 30, wherein the processor employs a Gauss-Newton method to determine the demand curve.

33. The system of claim 30, wherein the processor employs a Steepest Descent method to determine the demand curve.

34. The system of claim 30, wherein the input device receives a desired connection likelihood to each of the plurality of local communications providers and the processor determines a client load for each local communications provider corresponding to the demand curve determined therefore and the desired connection likelihood thereof, and apportions the load of clients to each of the plurality of local communications providers based on the determined client load thereof.

35. The system of claim 34, wherein the processor apportions the load of clients in a manner directly proportional to the client load at a desired connection likelihood specific to each of the plurality of local communications providers.

36. The system of claim 34, wherein the processor apportions the load of clients in a manner directly proportional to the client load at a desired connection likelihood common to all of each of the plurality of local communications providers.

37. The system of claim 30, wherein the input device receives a monetary cost per percentage increase in connection probability for each of the plurality of local communications providers, and the processor further determines a cost-corrected time-independent demand curve for each of the plurality of local communication proivider based on the monetary cost per percentage increase in connection probability for each of the plurality of local communications providers, and apportions the load of clients across the plurality of local communications providers based on the cost-corrected time-independent demand curve for each of the plurality of local communications providers.

38. The system of claim 37, wherein the monetary cost per percentage increase in connection probability for each of the plurality of local communications providers is variable.

39. The system of claim 37, wherein the processor determines the cost-corrected time-independent demand curve for each of the plurality of local communications providers based on the monetary cost per percentage increase in connection probability common to all of each of the plurality of local communications providers.

40. The system of claim 30, further comprising:
- a second input device operatively connected to the output device, wherein said second input device receives the apportionment of the load of clients;
- a second memory operatively connected to the second input device, wherein said second memory stores the apportionment of the load of clients;
- a second processor operatively connected to the memory, wherein the second processor determines connection data based on the apportionment of the load of clients and corresponding to a local communications provider to at least one client, said connection data adapted to provide the client with access to the network by way of the local communications provider; and
- a second output device operatively connected to the second processor, wherein the second output device transmits the connection data.

* * * * *

UNITED STATES PATENT AND TRADEMARK OFFICE
CERTIFICATE OF CORRECTION

| | | |
|---|---|---|
| PATENT NO. | : 7,356,584 B2 | Page 1 of 1 |
| APPLICATION NO. | : 10/379093 | |
| DATED | : April 8, 2008 | |
| INVENTOR(S) | : John Yip | |

It is certified that error appears in the above-identified patent and that said Letters Patent is hereby corrected as shown below:

In column 17, line 3, in Claim 19, delete "aftempts" and insert -- attempts --, therefor.

In column 17, line 25, in Claim 23, delete "farther" and insert -- further --, therefor.

In column 19, line 13, in Claim 37, delete "communication proivider" and insert -- communications providers --, therefor.

Signed and Sealed this

Twenty-second Day of February, 2011

David J. Kappos
*Director of the United States Patent and Trademark Office*